United States Patent [19]

Nilssen

[11] Patent Number: 4,692,681
[45] Date of Patent: Sep. 8, 1987

[54] BATTERY CHARGER WITH ADJUSTABLE CHARGING CURRENT

[76] Inventor: Ole K. Nilssen, Caesar Dr., Barrington Hills, Ill. 60010

[21] Appl. No.: 853,936

[22] Filed: Apr. 21, 1986

[51] Int. Cl.$^4$ .............................................. H02J 7/00
[52] U.S. Cl. ........................................ 320/2; 320/21; 320/51; 331/181; 323/347
[58] Field of Search ............... 320/2, 21, 22–24, 320/54, 10, 51; 368/204; 331/181, 185; 323/330, 331, 347

[56] References Cited

U.S. PATENT DOCUMENTS

| 2,029,628 | 2/1936 | Lord | 320/10 X |
|---|---|---|---|
| 3,803,475 | 4/1974 | Anichini | 320/54 X |
| 4,217,541 | 8/1980 | Weintraub et al. | 323/347 |

Primary Examiner—R. J. Hickey

[57] ABSTRACT

A battery charger comprises a self-oscillating inverter with saturable transformer means in its positive feedback circuit. The saturation flux density of the magnetic material used in this saturable transformer means determines the frequency of inverter oscillation. A permanent magnet is rotatably mounted adjacent the saturable transformer means and is used by way of cross-magnetization to adjustably affect the saturation flux density of the magnetic material, thereby correspondingly to adjust the frequency of oscillation: the more cross-magnetizing flux provided to the magnetic material from the permanent magnet, the smaller the saturation flux density and the higher the frequency of oscillation.

The battery charging current is attained from the inverter's squarewave voltage output by way of a series-excited parallel-loaded tuned L-C circuit, thereby providing for a battery charging current of magnitude dependent upon the frequency of inverter oscillation. Thus, by adjusting the position of the permanent magnet, the magnitude of the battery charging current can be adjusted over a wide range. In fact, in one of its extreme positions, the permanent magnet is operative to disable the inverter's self-oscillation, thereby entirely cutting off the charging current.

20 Claims, 3 Drawing Figures

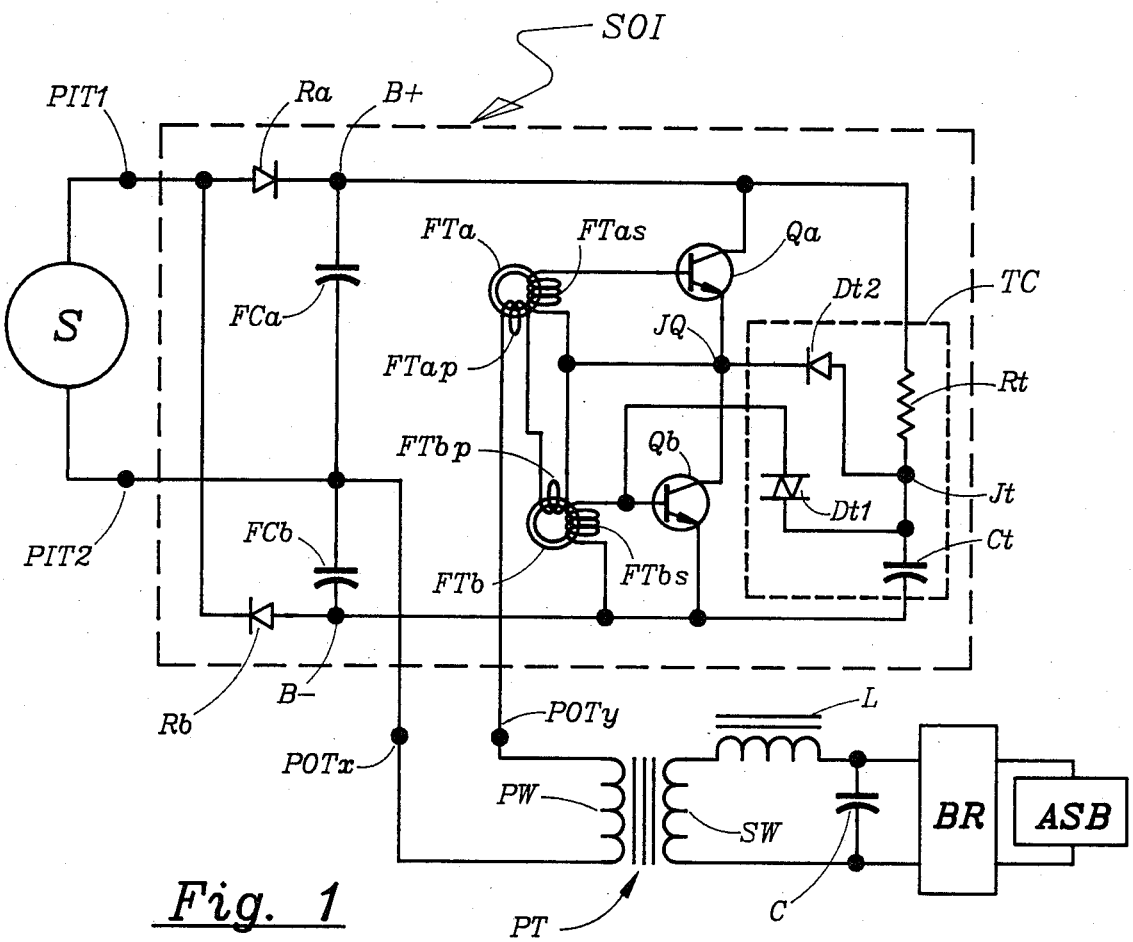
*Fig. 1*
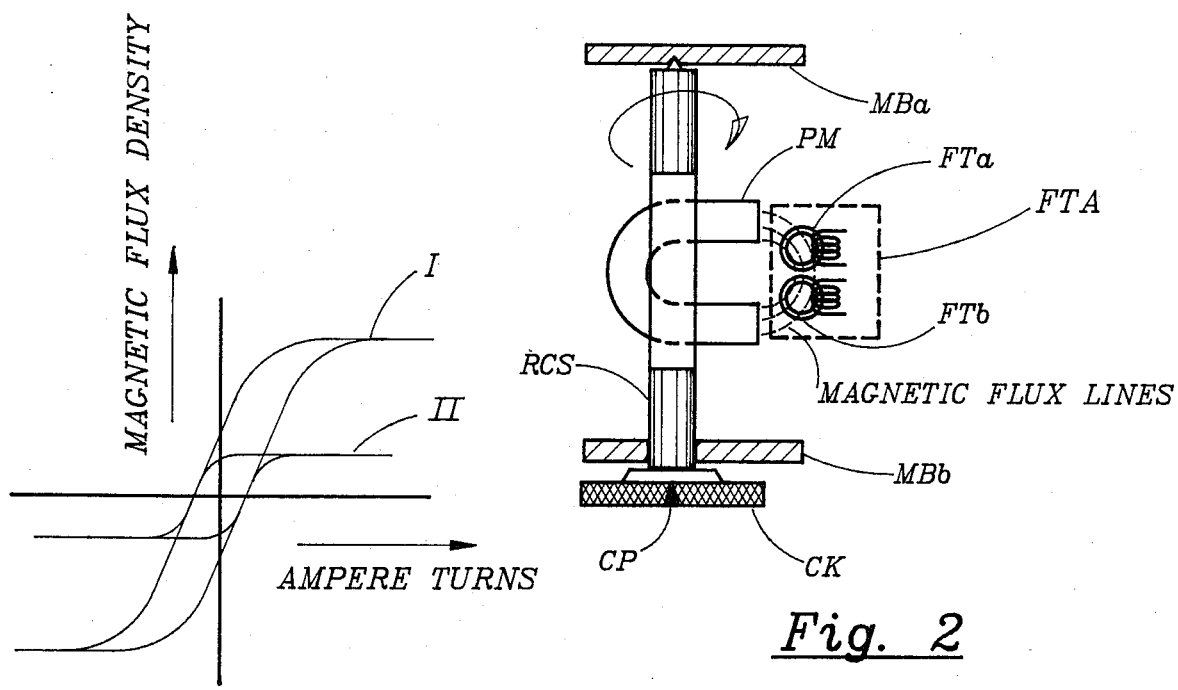
*Fig. 3*
*Fig. 2*

BATTERY CHARGER WITH ADJUSTABLE CHARGING CURRENT

BACKGROUND OF THE INVENTION

FIELD OF INVENTION

The present invention relates to automotive-type battery chargers, particularly of a kind having means for adjusting the magnitude of the charging current.

SUMMARY OF THE INVENTION

Objects of the Invention

An object of the present invention is that of providing a cost-effective means to permit simple manual adjustment of the charging current in an automotive-type battery charger.

This, is well as other objects, features and advantages of the present invention will become aparent from the following description and claims.

BRIEF DESCRIPTION

In the preferred embodiment of the present invention, regular power line voltage is rectified, filtered and applied to a self-oscillating half-bridge inverter. The two-transistor inverter provides its substantially squarewave output voltage to a pair of output terminals across which is effectively connected a series-L-C circuit—this L-C circuit being tuned at or near the frequency of the inverter's output voltage.

By way of rectifier means, an automotive battery is effectively connected in parallel-circuit with the capacitor of the L-C circuit, thereby charging this battery with the near-equivalent of a current source.

The inverter's self-oscillation is accomplished by feeding load current back to drive the base-emitter junctions of the inverter's two transistors. This positive feedback is accomplished by way of two saturable current transformers—one for each transistor. The frequency of oscillation is determined by the magnitude of the magnetic saturation flux of the ferrite cores of the two current transformers: the lower this saturation flux magnitude, the higher the frequency of oscillation.

A permanent magnet is mounted near the ferrite cores of the two saturable current transformers and so arranged that it can be manually adjusted in position relative to these two cores in such manner that the amount of cross-magnetizing magnetic flux from the permanent magnet that couples to these cores can be adjusted by adjusting the position of the magnet. The arrangement permits the degree of flux-coupling from the permanent magnet to the ferrite corres to be adjusted from an initial point of providing substantially zero cross-magnetizing flux to the ferrite cores to a final point of providing enough cross-magnetizing flux to cause effective cross-magnetic saturation of the two ferrite cores.

As a consequence, by adjustment of the position of the permanent magnet, the inverter's oscillation frequency is adjusted; which—due to the frequency-selective nature of the L-C circuit—means that the magnitude of the resulting charging current is correspondingly adjusted: the more cross-magnetizing flux provided, the higher the frequency, the more the de-tuning, and the lower the current magnitude. Eventually, with complete cross-magnetization, the inverter's self-oscillation ceases, and the magnitude of the charging current becomes zero.

Calibration marks are provided by which the magnitude of the charging current can be set in accordance with a predetermined desire.

BRIEF DESCRIPTION OF THE DRAWINGS

FIG. 1 provides a schematic diagram of the electrical circuitry of the automotive-type battery charger with its self-oscillating inverter having saturable inductance means in its feedback path.

FIG. 2 provides an illustration of an arrangement whereby a permanent magnet can be adjustably positioned relative to the saturable inductance means of the inverter.

FIG. 3 shows the saturation flux characteristics of the saturable inductance means under a first condition where substantially no cross-magnetizing flux is present, as well as under a second condition where a substantial amount of cross-magnetizing flux is present.

DESCRIPTION OF THE PREFERRED EMBODIMENT

Details of Construction

FIG. 1 shows a source of voltage S, which represents an ordinary 120 Volt/60 Hz electric utility power line. Connected across the output terminals of S, by way of its power input terminals PIT1 and PIT2, is subject self-oscillating inverter SOI.

Power input terminal PIT1 is connected with the anode of a first rectifier Ra and with the cathode of a second rectifier Rb. The cathode of rectifier Ra is connected with a B+ bus, and the anode of rectifier Rb is connected with a B− bus. A first filter capacitor FCa is connected between the B+ bus and power input terminal PIT2; and a second filter capacitor FCb is connected between power input terminal PIT2 and the B− bus.

A first transistor Qa is connected with its collector to the B+ bus and with its emitter to a junction JQ. A second transistor Qb is connected with its collector to junction JQ and with its emitter to the B− bus.

A first saturable current feedback transformer FTa has a primary winding FTap and a secondary winding FTas, which secondary winding is connected across the base-emitter junction of transistor Qa. A second saturable current feedback transformer FTb has a primary winding FTbp and a secondary winding FTbs, which secondary winding is connected across the base-emitter junction of transistor Qb.

A first inverter power output terminal POTx is connected directly with power input terminal PIT2. A second inverter power output terminal POTy is connected with junction JQ by way of series-connected primary windings FTap and FTbp.

A resistor Rt is connected between the B+ bus and a junction Jt; a capacitor Ct is connected between Jt and the B− bus; a Diac Dt1 is connected between Jt and the base of transistor Qb; and a diode Dt2 is connected with its anode to junction Jt and with its cathode to junction JQ.

The circuit comprising elements Rt, Ct, Dt1 and Dt2 is referred to as trigger circuit TC.

Connected across power output terminals POTx and POTy is the primary winding PW of a power transformer PT, the secondary winding SW of which is connected with a series-combination on an inductor L and a capacitor C. The input terminals of a bridge rectifier BR are connected across capacitor C; and the output terminals of this bridge rectifier are connected with the terminals of an automotive storage battery ASB.

FIG. 2 pseudo-schematically shows the mechanical arrangement by which a permanent magnet PM is mounted to a rotatable control shaft RCS; which shaft, in turn, is frictionally supported by mounting brackets MBa and MBb in such manner as to permit rotatable movement. A control knob CK with a calibrations pointer CP is fastened to the control shaft.

The two feedback transformers FTa and FTb are mounted in close and substantially rigid physical relationship with one another and are jointly referred to as ferrite transformer assembly FTA. This assembly, in turn, is mounted in a substantially rigid relationship with mounting brackets MBa and MBb and in such manner as to be in relative close proximity to the poles of the permanent magnet when it is positioned as shown. By way of control knob CK, permanent magnet PM may be rotatably moved in relationship to ferrite transformer assembly FTA, thereby correspondingly to adjust the amount of the magnetic flux from the permanent magnet being intercepted by the ferrite transformer assembly.

FIG. 3 shows the magnetic characteristics of each of the ferrite cores in the ferrite transformer assembly for two different amounts of cross-magnetizing flux provided by the permanent magnet. Curve I shows the magnetic characteristics when no cross-magnetizing flux is present; curve II shows the magnetic characteristics when a fairly strong cross-magnetizing flux is present.

Details of Operation

The operation of the self-oscillating inverter circuit of FIG. 1 is substantially conventional and is explained in detail in conjunction with FIG. 8 of U.S. Pat. No. Re. 31,758 to Nilssen.

The frequency of oscillation of this inverter is determined by the saturation flux density of the ferrite cores in the feedback transformers: the higher this saturation flux density, the lower the frequency of oscillation.

When the magnetic flux from a permanent magnet is made to cross-magnetize the ferrite cores, as illustrated in FIG. 2, the saturation flux density of the ferrite cores diminishes, as indicated in FIG. 3.

The particular position of the permanent magnet in FIG. 2 provides for a maximum degree of cross-magnetization; which implies that, with the magnet in that position, the inverter's oscillation frequency will be at its maximum. By twisting the magnet away from the particular position shown, the degree of cross-magnetization diminishes, and the inverter's oscillation frequency decreases.

By suitably selecting the maximum amount of flux caused to penetrate the ferrite cores—i.e., beyond the level indicated by curve II of FIG. 3—complete removal of positive feedback results, and inverter oscillation ceases.

Thus, by suitable choice of design parameters, the frequency control arrangement of FIGS. 1-3 can be arranged such that—in the extreme position, as shown in FIG. 2—inverter oscillation is made to cease, thereby entirely to remove the high frequency voltage from the inverter's output terminals.

The L-C circuit consisting of inductor L and capacitor C in FIG. 1 is tuned to resonance at or near the inverter's frequency at the point where there is substantially no cross-magnetizing flux penetrating the ferrite cores of FTa and FTb; which implies that the charging current provided to battery ASB will be at its maximum at that point.

As cross-magnetizing flux from the permanent magnet is made to increase, the inverter's oscillation frequency increases, thereby in effect causing de-tuning of the L-C circuit; which, in turn, will result in reducing the magnitude of the charging current. Eventually, with a relatively large amount of cross-magnetizing flux provided to the ferrite cores of FTa and FTb, inverter oscillation ceases and charging current stops flowing.

Additional Comment (a) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. In a battery charger adapted by way of a source of AC voltage to provide battery charging current to a storage battery connected with a charger output, the improvement comprising:
   charging control means: (i) connected with the source of AC voltage, (ii) receptive of magnetic flux, and (iii) operative in response to this magnetic flux to control the frequency of the AC voltage;
   rectifier and current-limiting means connected with the AC voltage and operative to provide the battery charging current, the magnitude of the battery charging current being dependent on the frequency of the AC voltage; and
   magnetic flux means magnetically coupled with the charging control means and adapted to provide controllable magnetic flux to this control means, thereby to permit control of the frequency of the AC voltage and thereby the magnitude of the charging current.

2. The improvement of claim 1 wherein the magnetic flux means comprises permanent magnet means operative to provide at least part of the magnetic flux.

3. The improvement of claim 2 wherein the permanent magnet means is adjustable in position relative to the charging control means.

4. The improvement of claim 1 wherein the magnetic flux means comprises magnetic control means operative to permit control of the magnetic flux by way of physical positioning of the magnetic flux means relative relative to the charging control means.

5. The improvement of claim 1 wherein the magnetic flux means is operative to permit substantially complete removal of the charging current.

6. The improvement of claim 1 wherein the magnitude of the charging current is substantially continuously adjustable from a maximum level to a minimum level.

7. The improvement of claim 6 wherein the minimum level corresponds to complete removal of the charging current.

8. A battery charger comprising:
   a source of unidirectional voltage;
   inverter means connected with this source and operative to convert the unidirectional voltage to an AC voltage, the inverter means having inverter control means receptive of magnetic flux and operative in response thereto to control the frequency of this AC voltage;

rectifier and current-limiting means connected with the AC voltage and operative to provide a DC current to a battery, the magnitude of the DC current being dependent on the frequency of the AC voltage; and magnetic flux means adapted to provide magnetic flux to the inverter control means, thereby to permit control of the frequency of the AC voltage and thereby of the magnitude of the DC current.

9. The arrangement of claim 8 wherein the magnetic flux means comprises permanent magnet means operative to provide at least part of the magnetic flux.

10. The arrangement of claim 9 wherein the permanent magnet means is adjustable in position relative to the inverter control means.

11. The arrangement of claim 8 wherein the magnetic flux means comprises magnetic control means operative to permit control of the magnetic flux by way of physical positioning of the magnetic flux means relative to the inverter control means.

12. The arrangement of claim 11 wherein the magnetic control means comprises calibration means operative to permit calibration of the frequency of the AC voltage versus the physical position of a part of the magnetic control means.

13. The arrangement of claim 8 wherein the magnetic flux means is operative to provide for substantial removal of the DC current from the battery.

14. The arrangement of claim 8 wherein the magnitude of the DC current provided to the battery is continuously adjustable from a maximum level to a minimum level.

15. The arrangement of claim 14 wherein the minimum level corresponds to complete removal of the DC current.

16. A battery charger comprising:

inverter means adapted to connect with a source of DC voltage and to convert this DC voltage to an AC voltage, the inverter means being self-oscillating by way of positive feedback and having feedback means comprising saturable inductor means, the frequency of the AC voltage being controllable by way of a controllable amount of magnetic flux caused to penetrate the saturable inductor means;

rectifier and current-limiting means connected with the AC voltage and operative to provide a DC current to a battery, the magnitude of the DC current being dependent on the frequency of the AC voltage; and magnetic flux means movably positioned near the saturable inductor means and operative to permit an adjustable amount of magnetic flux to penetrate the saturable inductor means, thereby to permit control of the magnitude of the DC current provided to the battery.

17. The arrangement of claim 16 wherein the magnetic flux means comprises permanent magnet means.

18. The arrangement of claim 16 wherein the magnetic flux means is operative to permit cessation of the self-oscillation of the inverter means, thereby to remove the DC current from the battery.

19. The arrangement of claim 16 comprising indicator means operative to indicate the amount of magnetic flux caused to penetrate the saturable inductor means, thereby to indicate the magnitude of the DC current being provided to the battery.

20. The arrangement of claim 16 wherein the magnitude of the DC current provided to the battery is continuously adjustable from a maximum level to a minimum level.

* * * * *